Jan. 9, 1968 F. SINGER 3,362,311
PHOTOGRAPHIC SHUTTER
Filed July 2, 1965 3 Sheets-Sheet 1

Jan. 9, 1968          F. SINGER          3,362,311
                  PHOTOGRAPHIC SHUTTER
Filed July 2, 1965                    3 Sheets-Sheet 3

United States Patent Office 3,362,311
Patented Jan. 9, 1968

3,362,311
PHOTOGRAPHIC SHUTTER
Franz Singer, Munich, Germany, assignor to Compur-Werk Gesellschaft mit beschrankter Haftung & Co., Munich, Germany, a firm of Germany
Filed July 2, 1965, Ser. No. 469,224
Claims priority, application Germany, July 10, 1964, C 33,379
4 Claims. (Cl. 95—53)

ABSTRACT OF THE DISCLOSURE

A photographic shutter has a spring-loaded master member capable of a running-down movement from a cocked or tensioned position to a rest or run-down position, and during the running-down movement it opens and then closes the shutter blades. A first latch holds the master member in tensioned position, and a second latch holds it in an intermediate position in which the blades are open. The cooperating surfaces between the master member and both latches are so shaped that the pressure of the master member against the latches tends to move the latches to unlatched position. No other forces are needed to move either latch to unlatched position, other than the pressure of the master member against the latch. Each latch is held in latched position and prevented from becoming unlatched, by the armature of an electromagnet in an electrical circuit which energizes the second electromagnet to attract its armature, at a variable time after the beginning of the opening movement of the shutter blades, thereby varying the time that the blades will be kept in open position by the operation of the second latch.

---

This invention relates to a photographic shutter, and more particularly to a shutter controlled electrically or electronically.

An object of the invention is the provision of a generally improved and more satisfactory shutter of this kind.

Another object is the provision of a shutter so designed as to reduce the frictional resistance to movement of the parts which are to be moved electrically, thereby enabling the movement of such parts by smaller forces than would otherwise be required, and enabling the use of a smaller and lighter battery.

Still another object is the provision of a shutter in which the main driving member or master member is latched in its running-down movement, either in an initial position, with the shutter blades closed, or in an intermediate position, with the blades open, or preferably in both positions, by magnetically released latching mechanism so designed that the armature of the releasing magnet is acted upon only by the force of an intermediate member which absorbs most of the force of the master member.

A further object is the provision of such mechanism wherein the cooperating parts of the master member and the intermediate member are so shaped that the force of the master member tends to move the intermediate member to an unlatching position, with slight force which is transmitted to the armature of the releasing magnet, so that there is but little resistance to the movement of the armature.

A still further object is the provision of improved means for easy adjustment of the magnetic releasing mechanism especially to set the air gap between the magnet and its armature at exactly the desired amount.

These and other desirable objects may be attained in the manner disclosed as an illustrative embodiment of the invention in the following description and in the accompanying drawings forming a part hereof, in which.

Figure 1:
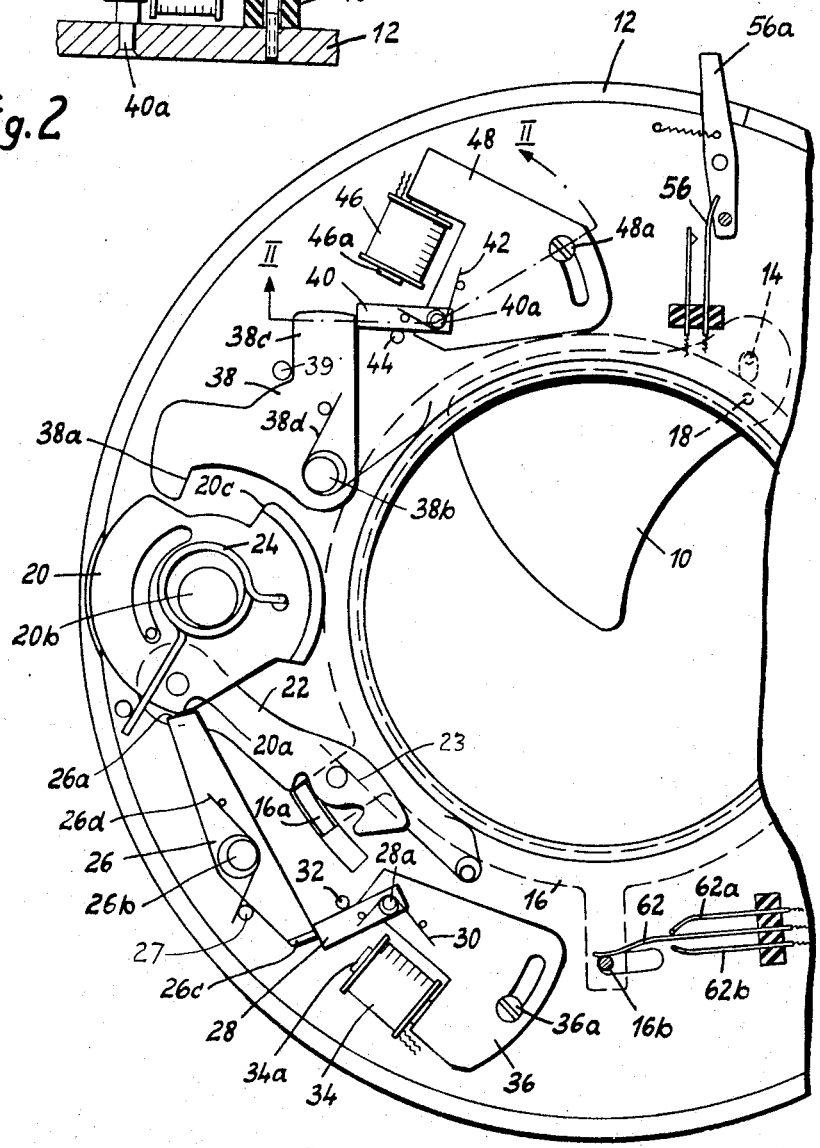
FIG. 1 is a fragmentary front view of a camera shutter according to a preferred embodiment of the present invention, with the front cover plate removed in order to show the parts within, and with certain parts omitted, the shutter being shown in its cocked or tensioned position ready for making an exposure.
Figure 2:
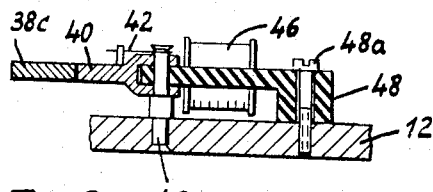
FIG. 2 is a fragmentary section taken approximately on the line II—II of FIG. 1, illustrating details.

In the preferred embodiment of the invention, the shutter is of the objective type, having the usual annular housing or casing indicated in general at 12. The central exposure aperture is closed by any desired number of conventional pivoted shutter blades 10, usually about five in number. For the sake of clarity, only one blade is illustrated, the others being similar. Each blade 10 is mounted on a fixed pivot 14 in the housing, and is operated by a rotary blade ring 16, connected to each blade by a pivot 18. As well understood in the art, when the blade ring is in the position shown in FIGS. 1 and 4, the shutter will be closed, each blade 10 extending part way across the exposure aperture and overlapping with the other blades to close the aperture. When the blade ring is turned counterclockwise from this position, to the position shown in FIG. 3, the blades will all be swung to an open position, permitting light to pass through the central aperture, along the optical axis, to make the desired exposure.

For imparting the desired rotary movements to the blade ring 16, to open and close the blades, there is a main driving member or master member 20, coupled to the blade ring 16 in known fashion by means of a link 22 pivoted to the master member and having a notch which engages an upstanding ear or lug 16a on the blade ring 16. The main driving spring or master spring 24 tends to turn the master member in a counterclockwise direction from the cocked or tensioned position shown in FIG. 1 to the intermediate position shown in FIG. 3 and then onward to the final rest position or run-down position shown in FIG. 4. During the first part of this turning movement, from the position shown in FIG. 1 to the position shown in FIG. 3, the link 22 is pushed so as to push the blade ring 16 in a blade opening direction. During the latter part of the movement, from the position shown in FIG. 3 to the position shown in FIG. 4, the link is pulled back again, pulling the blade ring 16 back in a clockwise direction to close the blades. The usual light spring 23 tends to hold the link 22 engaged with the ear 16a. A shaft 20b, extending rearwardly from the master member 20 out through the back of the shutter housing, is coupled in the usual conventional way to the film winding or film transport mechanism of the camera on which the shutter is mounted, and is utilized for tensioning or cocking the master member, turning it back in a clockwise direction from the run-down position of FIG. 4 to the tensioned position of FIG. 1. During this tensioning movement, the link 22 slips idly past the ear 16a without affecting the position of the blade ring 16. All these parts thus far described are conventional (except for the manner in which the master member is latched and controlled, as further described below) and operate in the conventional way, and need not be further described.

Turning now to the parts which more particularly constitute the present invention, the master member 20 is latched in its tensioned position (FIG. 1) by a latching member in the form of a double-armed lever 26 pivoted on a stationary pivot 26b in the housing 12. One end face 26a of the lever engages the abutment face 20a of the master member to hold the master member in its tensioned position. A light spring 26d tends to turn the latch lever 26 clockwise to its latching position limited by the stop pin 27.

In position of the pivot pin 26b relative to the master member 20, and the inclination of the end surface 26a of the latch lever, are so selected that the pressure of the master member against the latching lever tends to turn the latching lever counterclockwise, with a force only slightly greater than that required to overcome the force of the light restoring spring 26d. It is found in practice that a very satisfactory construction is produced when the end face 26a of the latching lever 26 is at an angle of about 15 degrees to a line normal or perpendicular to a line joining the contact point to the bearing pivot 26b; in other words, an angle of about 75 degrees to the last mentioned line from the contact point to the bearing pivot. With such an inclination, the power of the master spring 24 tending to turn the master member is resisted mainly by the endwise thrust against the latch member 26, toward the pivot 26b thereof, but this is accompanied by sufficient camming action, on account of the inclination of the face 26a, to swing the lever 26 aside to an unlatched position, unless the lever is otherwise restrained.

In order to restrain the latch member 26 and to prevent it from becoming unlatched by the pressure of the master member, except when desired, the latch member 26 has a second arm having a lug or ear 26c which bears against a pivoted armature 28 of an electromagnet 34. The armature 28 is pivoted on a pivot pin 28a and is urged by a light spring 30 toward a fixed stop pin 32 in the shutter housing. When the parts are in the latched position shown in FIG. 1, it is seen that the force or pressure of the master member 20, acting on the inclined surface 26a of the intermediate latch member 26, will tend to swing this latch member in a counterclockwise direction on its pivot 26b, but the intermediate latch member cannot turn in this direction because the armature 28, acting as a second latch member, prevents it.

The magnet winding 34, with its core or pole piece 34a, is mounted on the mounting plate 36 made of insulating material. This mounting plate is pivoted on the same pivot pin 28a on which the armature or second latch member 28 is pivoted, and is capable of limited swinging movement on the pivot 28a, to adjust the size of the air gap between the armature 28 and the magnet core 34a. The magnet is held in the desired position of adjustment by tightening the screw 36a which extends through an arcuate slot in the insulating mounting plate 36 and is threaded into a fixed part in the shutter housing. By this arrangement, it is possible to obtain a very precise adjustment of the air gap when the armature is in its normal rest position shown in FIG. 1, thereby allowing for accurate determination of the attracting force to which the armature will be subjected when the magnet winding is energized by current of a given magnitude.

Figure 3:
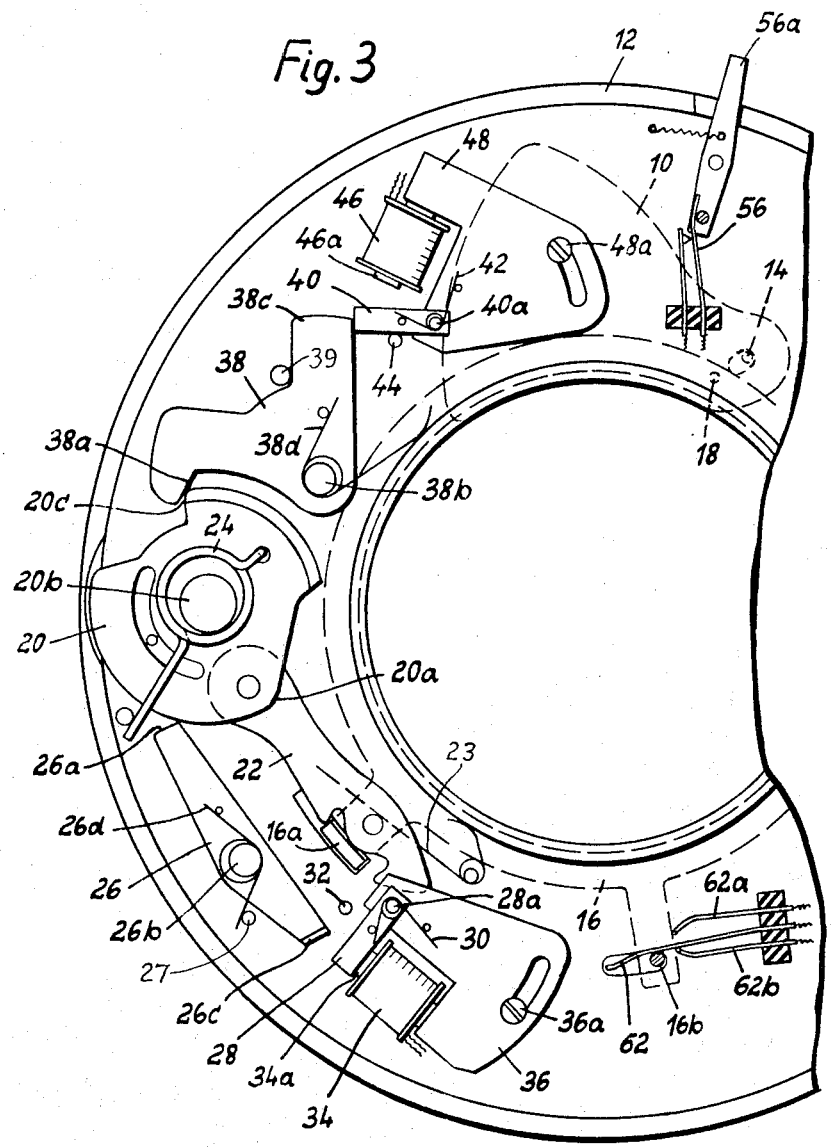
FIG. 3 is a view similar to FIG. 1, showing the shutter in the open position.

In addition to the above latch parts 26, 28, etc., for holding the master member in its initial tensioned position, there are other latch parts for latching the master member in an intermediate position in which the shutter blades are fully open. These other latch parts comprise an intermediate latch member 38 mounted on the fixed pivot pin 38b and having a latching nose with an abutment surface 38a for engagement with the abutment surface 20c of the master member, as seen in FIG. 3, when the master member reaches a position in which the blades are fully open, thereby stopping the running-down movement of the master member at this point, until the latch member is able to move aside.

A light spring 38d tends to swing the latching member in a counterclockwise direction on its pivot 38b, to tend to keep it in its normal rest position determined by a fixed stop pin 39. Just as in the case of the first intermediate latch member 26, the abutment surface of the latch member 38 is arranged at a slight inclination so that the pressure of the master member against the latch member will produce a camming action with sufficient force to overcome the resistance of the light return spring 38d and to thrust the latch member 38 aside unless it is otherwise held. As before, a suitable inclination is found to be about 15 degrees to a line normal to a line from the contact point to the pivot 38b; in other words, an angle of about 75 degrees to the last mentioned line from the contact point to the pivot.

To hold the latch member 38 in latching position until the desired time of release, there is a second latch member 40 which engages an arm 38c on the intermediate latch 38, and which constitutes the armature of a releasing magnet. The arrangement is quite similar to that already described in connection with the first latching mechanism, and it is only necessary to mention briefly that the armature 40 is pivoted at 40a, and is urged by the light spring 42 against a fixed stop 44. The magnet winding 46 and its core or pole piece 46a are mounted on the mounting plate 48 of insulating material, pivoted on the pivot 40a and held in adjusted position by tightening the screw 48a after adjustment to the proper air gap.

Figure 5:
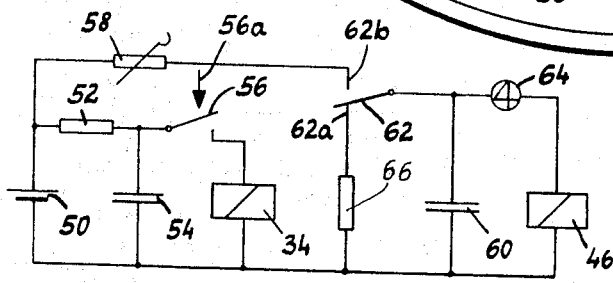
FIG. 5 is a wiring diagram of the electrical parts of the construction.

The two magnets 34 and 46 are connected in an electronic trip and delay circuit, preferably as shown in FIG. 5. A battery 50 supplies current through a resistor 52 to charge the capacitor 54. When the switch 56 is closed, the charge in the capacitor 54 is discharged through the magnet winding 34, thereby attracting the armature 28 of this magnet to the position shown in FIG. 3, where it no longer obstructs the latch member 26. The pressure of the master member surface 20a against the inclined surface 26a of the latch member 26 can now cam the member 26 from the latching position shown in FIG. 1 to the unlatched position shown in FIG. 3, so that the master member 20 can now begin its running-down movement and can open the shutter blades.

Figure 4:
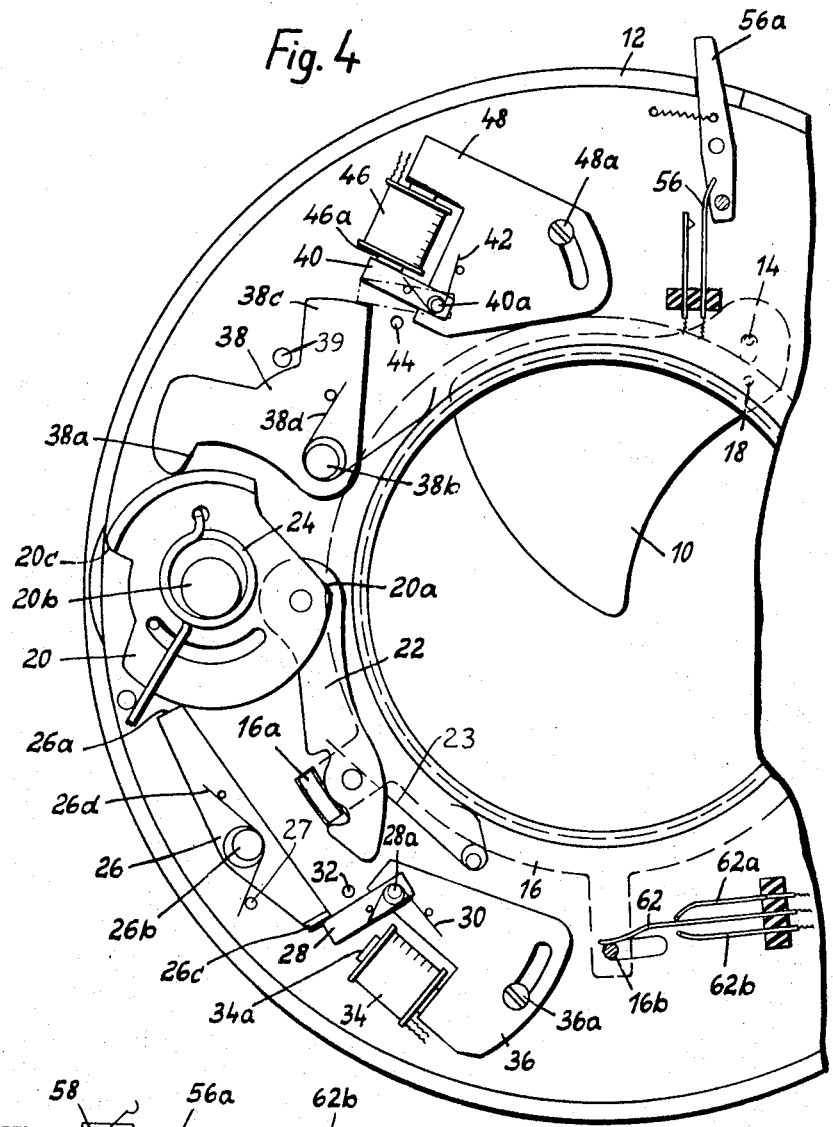
FIG. 4 is another view similar to FIG. 1, with the parts in the rest position or fully run-down position at the conclusion of an exposure.

The above mentioned switch 56, for initiating the operation of the shutter, may be placed in any desired location, remote from the shutter if it is desired to control the shutter remotely, or on the shutter it is desired to control it by local manual operation. In FIGS. 1, 3, and 4 of the drawings, the switch is illustrated as being mounted directly in the shutter housing 12, and is operated by a finger piece 56a projecting from the housing to an accessible position for manual actuation.

As above indicated, the first latch mechanism (parts 26, 28, 34 etc.) serves, when unlatched, to initiate the exposure cycle. The second latch mechanism (parts 38, 40, 46, etc.) stops the exposure cycle at an intermediate point with the blades fully open, and then when the second mechanism is unlatched the cycle is resumed and the blades are closed. The time interval between the opening of the blades and the operation of the second latch mechanism will thus determine the duration of the exposure or what is commonly referred to as the shutter speed.

The electronic circuit for determining the above mentioned time interval may be in the preferred form also illustrated in FIG. 5. The previously mentioned battery 50 supplies current, through a variable resistor 58, to charge a capacitor 60 when the movable switch member 62 makes contact with the contact 62b. The circuit through the winding 46 of the second latching mechanism is in parallel with the capacitor 60 and in series with a four-layer diode 64. When the changeover switch 62 is shifted from the contact 62b to the contact 62a, the capacitor 60 is discharged through the limiting resistor 66.

If it is desired to control the shutter speed manually, the variable resistor 58 will be a manually adjusted resistance, with a scale calibrated in terms of shutter speed. If it is desired to have automatic control, the variable resistor 58 will be a photoresistor responding to the brightness of light, and there may be the usual conventional means for adjusting the circuit to take into account the film speed and the filter factor.

The changeover switch 62 is preferably mounted in the shutter housing and is operated automatically by the movement of the blade ring 16, as illustrated in FIGS. 1, 3 and 4. There is an insulating pin 16b on an arm of the blade ring, which engages the resilient contact member 62 to hold it against the contact member 62a when the shutter blades are closed as in FIGS. 1 and 4. When the blade ring 16 moves to open the blades, the pressure of the pin 16b against the switch member 62 is relieved, and the resilience of the member 62 moves it away from the contact member 62a and into contact with the member 62b, so that the circuit from the battery 50 to the capacitor 60 is then completed and the battery begins to charge the capacitor 60 at a rate dependent upon the resistance of the variable resistor 58.

As the electrical charge gradually builds up in the capacitor 60, it finally reaches the breakdown voltage of the four-layer diode 64, so that the charge in the capacitor 60 can then discharge through the diode 64 and the magnet winding 46. The energization of the winding 46 attracts the armature 40 from the position shown in FIG. 3 to the position shown in full lines in FIG. 4, so that it no longer holds the intermediate latching member 38. The camming action of the master member surface 20c against the inclined surface 38a now thrusts the member 38 aside, allowing the master member to resume its running down movement from the position of FIG. 3 to the position of FIG. 4, thereby closing the blades.

It is believed that the operation of the shutter will be clear from what has already been said. However, it may be well to recapitulate briefly and to mention a few additional points. Before an exposure can be made, it is necessary to tension or cock the shutter, from the position of FIG. 4 to the position of FIG. 1. This is done by turning the shaft 20b in a clockwise direction. When the master member has been turned about half way back toward its cocked position, a recess in the periphery of the master member comes opposite the nose of the intermediate latching member 38, so that the spring 38d can move this member to the latched position shown in FIGS. 1 and 3, and the spring 40a then causes the latching armature 40 to snap behind the member 38 to hold it in latching position. When the master member 20 turns farther in a clockwise direction and reaches its fully tensioned position, the intermediate latching member 26 snaps behind the shoulder 20a of the master member, under the influence of its spring 26d, and the latching armature 28 snaps behind the ear 26c of the member 26, under the influence of the spring 30. The parts are then in the position of FIG. 1, ready for making an exposure. The switch 56 is open, so no current flows through the winding 34, although the capacitor 54 is fully charged. The switch 62 makes contact with 62a but not with 62b, so the capacitor 60 is fully discharged and there is no flow of current through the winding 46.

The exposure cycle may now be started by closing the switch 56. This discharges the capacitor 54 through the winding 34, attracting the latching armature 28 to its unlatching position. The intermediate latching member 26 is now cammed aside by the pressure of the master member against the inclined surface 26a, and the master member begins its running-down movement under the influence of the master spring 24, opening the shutter blades. The movement stops in the position shown in FIG. 3, because the surface 20c of the master member then comes into contact with the surface 38a of the latch member 38.

Meanwhile, the first part of the movement of the blade ring toward open position has moved the pin 16b to cause the resilient switch member 62 to make contact with the member 62b instead of the member 62a. Therefore, the capacitor 60 begins to be charged, at a rate dependent upon the variable resistance 58. When a sufficient charge has built up in the capacitor to reach the breakdown voltage of the transistor 64, the capacitor discharges through the winding 46, attracting the armature 40, thereby unlatching the intermediate latching member 38 so that the camming action of the master member against the inclined surface 38a can thrust this surface aside, and the master member can complete its running down movement, to close the shutter blades.

When the shutter blades are closed, the pin 16b on the blade ring 16 once more moves the resilient switch member 62 out of contact with the member 62b and into contact with the member 62a. If there is any charge remaining in the capacitor 60, it is now fully discharged through the resistor 66. Thus it is insured that every time a new exposure cycle starts, it commences with the capacitor 60 in a fully discharged condition, with no residual charge remaining from the previous exposure, which might adversely affect the reliability and accuracy of the R-C circuit used to time the duration of exposure.

It is noteworthy that the R-C timing circuit controlling the speed of exposure does not begin to operate until the shutter blades begin to open, i.e., until the blade ring 16 moves the pin 16b to operate the changeover switch 62. Thus the accuracy of timing the exposure duration is not influenced by any delay that may accidentally occur in unlatching the first latch mechanism (26, 28, etc.) which controls the beginning of the running-down movement of the master member. Even if this first latch mechanism operates more slowly than it should, or faster than it should, this does not affect the exposure speed.

Also it is noted that the shape of the latching members 26, 28, 38, and 40 is such that no jamming can possibly occur. The movements of the armature latch members 28 and 40, when attracted by their respective magnet windings 34 and 46, are smooth movements with very little frictional resistance because of the relatively light pressure exerted by the respective intermediate members 26 and 38 against the ends of the respective members 28 and 40. The intermediate latch members 26 and 38 can not jam, because the above mentioned inclinations of the respective faces 26a and 38a constitute cams which cause movement of the intermediate latching members in an unlatching direction, rather than resisting such movement.

Moreover, it is noted that the pressure exerted by the master spring 24, in attempting to turn the latch members 26 and 38 in an unlatching direction, is exerted at a time when the shutter blades 10 themselves are not moving. Therefore the exertion of such force, in attempting to cam the latch members out of the way, can not affect the accuracy of timing the exposure.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a master member movable through a running-down movement from a tensioned position to a run-down position and effective during such movement first to open and then to close a shutter blade, a latching member for latching said master member in a predetermined position, the part of said latching member which engages said master member being at an oblique inclination so shaped that the pressure of said master member against said latching member tends to move said latching member to an unlatched position, an armature for blocking said latching member against movement toward unlatched position, and an electromagnet effective, when energized, to move said armature to an unblocking position with respect to said latching member, so that the pressure of said master member against said latching member may move said latching member to an unlatched position with respect to said master member.

2. A construction as defined in claim 1, in which said latching member is in the form of a pivoted lever, and in which the pressure of said master member against said latching member is exerted mainly in a direction toward the pivot of said lever, and in which said armature is a pivoted armature movable toward said electromagnet when said electromagnet is energized and away from said electromagnet when said electromagnet is de-energized, said pivoted armature when said electromagnet is de-energized being in a position overlapping a portion of said latching member to block swinging movement of said latching member on its pivot in response to displacing force exerted on said latching member by pressure of said master member, energization of said electromagnet serving to move said armature to a position wherein said latching member may swing on its pivot independently of said armature.

3. A photographic shutter comprising a spring loaded main driving member movable through a running-down movement to open and close shutter blade means, an intermediate latch member for latching said driving member against movement in a running-down direction, and an electromagnet having an armature serving as a latch to hold said intermediate latch member in a latching position with respect to said main driving member, characterized by the fact that the mutually cooperating surfaces of said main driving member and said intermediate latch member are so formed that pressure of said main driving member against said intermediate latch member tends to move said intermediate latch member from latching position to an unlatching position and will cause such movement when said armature is moved to an unlatched position with respect to said intermediate latch member, so that that main driving member may move in a running-down direction, and further characterized by the fact that said armature is in the form of a pivotally mounted lever and is movable by a restoring spring against a fixed stop, and that said electromagnet is mounted on a plate pivoted for swinging movement about the pivot of said armature lever, for setting the air gap between said electromagnet and said armature lever when the latter is against its fixed stop, and means for holding said pivoted plate in adjusted position.

4. A photographic shutter comprising a spring loaded main driving member movable through a running-down movement to open and close shutter blade means, an intermediate latch member for latching said driving member against movement in a running-down direction, and an electromagnet having an armature serving as a latch to hold said intermediate latch member in a latching position with respect to said main driving member, characterized by the fact that the mutually cooperating surfaces of said main driving member and said intermediate latch member are so formed that pressure of said main driving member against said intermediate latch member tends to move said intermediate latch member from latching position to an unlatching position and will cause such movement when said armature is moved to an unlatched position with respect to said intermediate latch member, so that said main driving member may move in a running-down direction, said intermediate latch member being pivotally mounted for swinging movement, and the cooperating surfaces of said main driving member and said intermediate latch member being formed at an angle of approximately 75 degrees to a line drawn from the point of cooperating contact to the pivot of said latch member and are sloped in such direction that the contact pressure tends to swing said intermediate latch member aside to an unlatched position.

References Cited
UNITED STATES PATENTS

| | | | |
|---|---|---|---|
| 2,782,698 | 2/1957 | Hill | 95—63 |
| 3,043,203 | 7/1962 | Buhrle | 95—63 |
| 3,205,804 | 9/1965 | Topaz | 95—55 |

JOHN M. HORAN, *Primary Examiner.*